(12) United States Patent
Ragos et al.

(10) Patent No.: US 11,721,891 B2
(45) Date of Patent: Aug. 8, 2023

(54) ANTENNA HAVING AN INTERNAL CABLE TOWER AND GUIDES FOR PRECISE CABLE PLACEMENT AND METHOD FOR CONSTRUCTING THE SAME

(71) Applicant: John Mezzalingua Associates, LLC, Liverpool, NY (US)

(72) Inventors: Jordan Ragos, Syracuse, NY (US); Karthik Janardhanan, Baldwinsville, NY (US); Evan C. Wayton, Tully, NY (US); Mario Scalzo, Rome, NY (US)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 0 days.

(21) Appl. No.: 17/642,777

(22) PCT Filed: Oct. 21, 2020

(86) PCT No.: PCT/US2020/056589
§ 371 (c)(1),
(2) Date: Mar. 14, 2022

(87) PCT Pub. No.: WO2021/081042
PCT Pub. Date: Apr. 29, 2021

(65) Prior Publication Data
US 2022/0352626 A1    Nov. 3, 2022

Related U.S. Application Data

(60) Provisional application No. 62/923,786, filed on Oct. 21, 2019.

(51) Int. Cl.
*H01Q 1/24*    (2006.01)
*H01Q 1/50*    (2006.01)
(Continued)

(52) U.S. Cl.
CPC ............. *H01Q 1/50* (2013.01); *H01Q 1/1228* (2013.01); *H01Q 1/246* (2013.01); *H01Q 1/42* (2013.01); *H02G 3/32* (2013.01)

(58) Field of Classification Search
CPC .......... H01Q 1/1228; H01Q 1/42; H01Q 1/50; H01Q 21/00; H01Q 1/246; H01Q 21/0025
See application file for complete search history.

(56) References Cited

U.S. PATENT DOCUMENTS 10,164,346 B2 *  12/2018  Ming ............... H01Q 1/246
11,108,137 B2 *  8/2021   Liu ................. H01Q 1/246
(Continued)

FOREIGN PATENT DOCUMENTS

| CN | 109066501 A | 12/2018 |
| CN | 109193109 A | 1/2019 |
| WO | 2019118119 A1 | 6/2019 |

OTHER PUBLICATIONS

International Searching Authority, International Search Report and Written Opinion, Application No. PCT/US2020/056589, dated Feb. 17, 2021, (pp. 9).

*Primary Examiner* — Hasan Islam
(74) *Attorney, Agent, or Firm* — Barclay Damon LLP

(57) ABSTRACT

A sector antenna is provided comprising a base plate, a cable tower mounting to the base plate and at least one reflector mounting to the base plate and substantially parallel to the axis of the cable tower. The reflector includes a plurality of electrical components operative to transmit and receive telecommunications signals in an arcuate sector of the antenna. The reflector has an inwardly facing surface opposing the cable tower and an outwardly facing surface disposed away from the cable tower. Furthermore, a cable guide plate is interposed between the cable tower and the reflector such that apertures formed in the cable guide plate (Continued)

may provide a guide through which a conductor may pass for making an electrical connection to one of the electrical components along the outwardly-facing surface of the reflector. The cable guide plate apertures align with the reflector apertures and provide a guide to operators when assembling, maintaining and repairing the telecommunications antenna.

8 Claims, 9 Drawing Sheets

(51) Int. Cl.
  *H01Q 1/12* (2006.01)
  *H01Q 1/42* (2006.01)
  *H02G 3/32* (2006.01)

(56) References Cited

U.S. PATENT DOCUMENTS

2015/0156642 A1  6/2015  Sobczak et al.
2018/0026327 A1  1/2018  Hendrix et al.

* cited by examiner

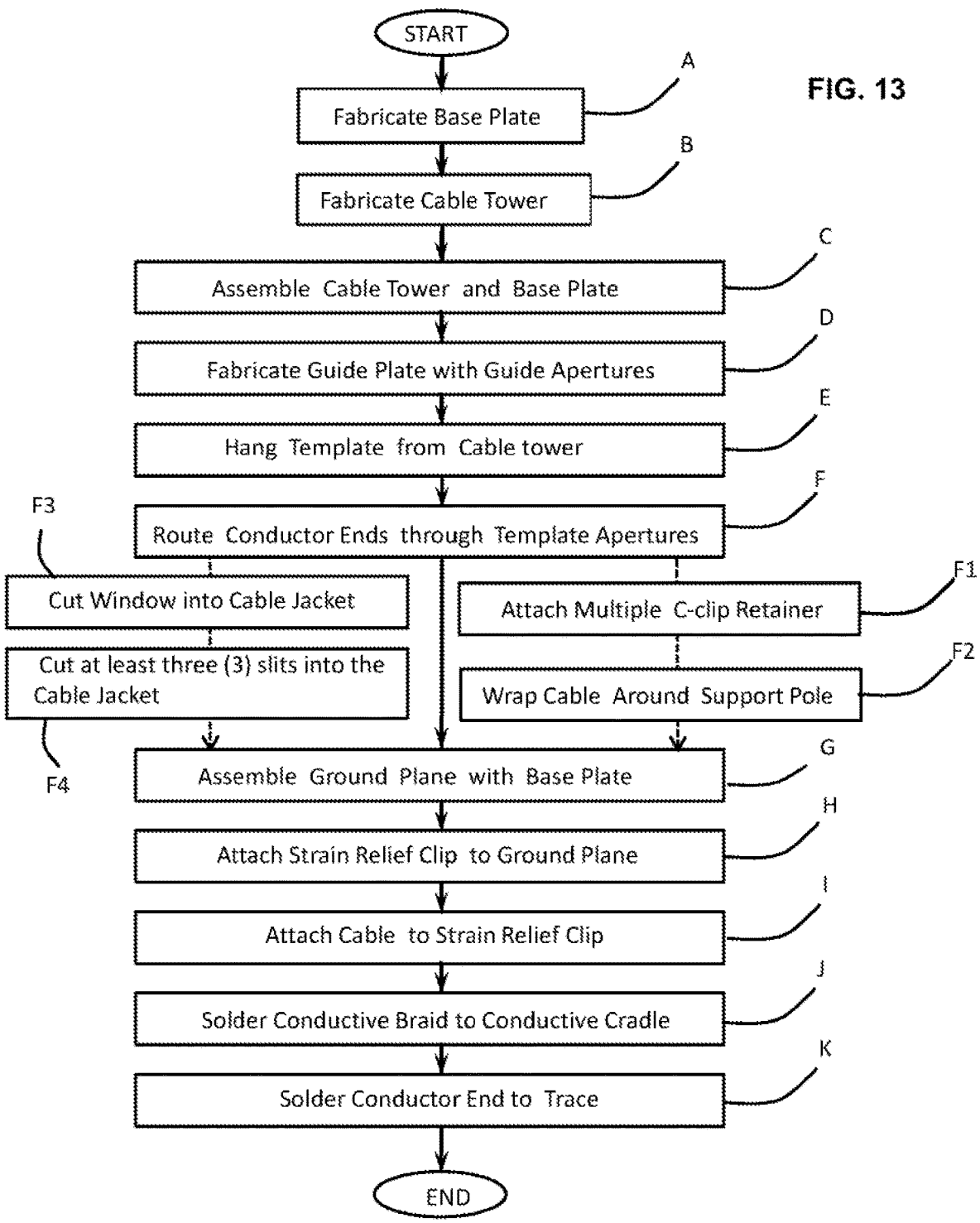

ANTENNA HAVING AN INTERNAL CABLE TOWER AND GUIDES FOR PRECISE CABLE PLACEMENT AND METHOD FOR CONSTRUCTING THE SAME

CROSS-REFERENCE TO RELATED APPLICATIONS

This application claims the benefit of and priority to U.S. Provisional Patent Application No. 62/923,786, filed on Oct. 21, 2019, the contents of which is incorporated herein by reference.

COPYRIGHT NOTICE

Portions of this document may contain material which is subject to copyright protection. The copyright owner has no objection to the facsimile reproduction of the patent disclosure, as it appears in the Patent and Trademark Office patent files or records, but otherwise reserves all rights relating to the reproduction, distribution, copying and display of this copyrighted work.

TECHNICAL FIELD

The present invention relates to telecommunication antennas, and more particularly, to a telecommunications cable harness tower for integrating and supporting a plurality of sector antennas. More specifically, the telecommunications antenna of the present disclosure facilitates ease of assembly, repair and maintenance.

BACKGROUND

As the number of mobile telecommunications subscribers increase, i.e., consumers of telephone and mobile device services, there is a commensurate need for land-based Macro Antenna Systems (MAS) to support the subscriber base. This need is greatest felt in urban areas where the density of users has placed significant demands on the telecommunications infrastructure. To mitigate the demands on the network, telecommunications service providers have added capacity on any one of a variety of elevated structures throughout a city. For example, small cell antennas are being added to building rooftops and telephone poles to add capacity to the telecommunications system.

These antennas resemble conventional sector antennas which include three vertically-oriented, radiating array faces disposed at one-hundred and twenty degree (120°) segment about a center axis, thereby producing an equilateral triangle. A typical antenna is commonly about three feet (3.0') tall with a diameter of about one (1.0) to one and one-half feet (1.5') producing a volume of about three cubic feet (3.0 ft$^3$). While such dimensions would seemingly accommodate many installations, there is still a need for further miniaturization of such antennas, particularly, in the overall height dimension thereof.

Due to the diminished size of such antennas, it can be difficult to house and route the various coaxial cables electrically interconnecting the radiators of the sector antennas. Inasmuch as there can be sixty feet (60') of coaxial cable in a three cubic foot (3.0 ft$^3$) antenna, determining a suitable and efficient routing path is crucial. The smaller the internal dimensions, the more difficult it becomes to route the coaxial cable from one panel to another It is also particularly important that cables are not routed over or under any radiating elements, and do not interfere with any moving parts, especially, if a Remote Electrical Tilt (RET) system is employed. As a consequence, the practical effect of such reduced real estate is the complication, time and, consequently, cost associated with assembly, repair and maintenance of the sector antenna.

The foregoing describes some, but not necessarily all, of the problems, disadvantages and shortcomings related to antennas for urban applications. Accordingly, there is a need to otherwise eliminate or lessen the disadvantages discussed above.

SUMMARY

A sector antenna is provided comprising a base plate, a cable tower mounting to the base plate and at least one reflector mounting to the base plate and substantially parallel to the axis of the cable tower. The reflector includes a plurality of electrical components operative to transmit and receive telecommunications signals in an arcuate sector of the antenna. The reflector has an inwardly facing surface opposing the cable tower and an outwardly facing surface disposed away from the cable tower. Furthermore, a cable guide plate is interposed between the cable tower and the reflector such that apertures formed in the cable guide plate may provide a guide through which a conductor may pass for making an electrical connection to one of the electrical components along the outwardly-facing surface of the reflector. The cable guide plate apertures align with the reflector apertures and provide a guide to operators when assembling, maintaining and repairing the telecommunications antenna.

Additional features and advantages of the present disclosure are described in, and will be apparent from, the following Brief Description of the Drawings and Detailed Description.

BRIEF DESCRIPTION OF THE DRAWINGS

FIG. 13 depicts the method steps for fabricating the telecommunications antenna according to the teachings of the present disclosure.

DETAILED DESCRIPTION

This disclosure is directed to an antenna and method for fabricating the same which facilitates ease of assembly and disassembly, mitigates errors in assembly, reduces cost associated with rework while minimizing the height, diameter and volume of the antenna. It will be appreciated that the disclosure may apply to a sector antenna, or an omnidirectional antenna, having multiple radiators in at least two planes which, furthermore, employ coaxial cables to electrically transmit signals.

Antenna Having Cable Guide Plate-Assisted Assembly, Maintenance and Repair

Figure 1:
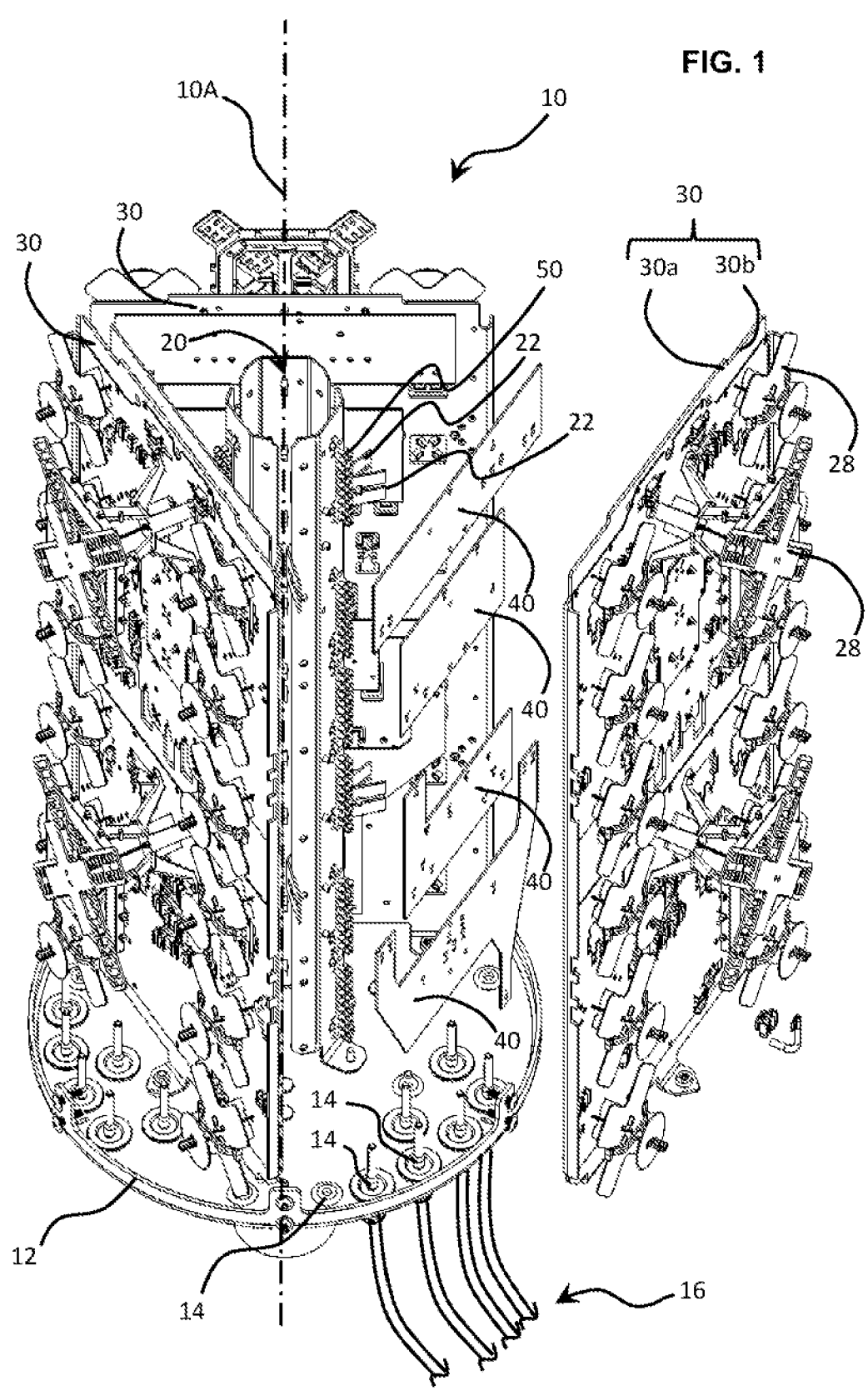
FIG. 1 depicts an exploded, perspective view of an antenna according to an embodiment of the present disclosure including: (i) a base plate for receiving a plurality of signal transmitting cables, (ii) a vertical cable tower normal to the base plate, (iii) a plurality of reflectors each having a printed circuit board (PCB) including conductive traces electrically connecting to at least one of a plurality of radiators, (iv) a plurality of cable guide plates disposed between the vertical cable tower and each reflector, each cable guide plate operative to guide a center conductor of each coaxial cable to its proper, preselected location through the backside surface of the associated reflector, and (v) a variety of securement devices disposed around the central cable tower and through at least one of the cable guide plates for electrically connecting to a predetermined trace along one of the PCBs.

In FIG. 1, a telecommunications antenna 10 includes a circular base plate 12 having a plurality of apertures 14, each for receipt of a coaxial cable 16. The base plate 12 mounts to a centrally located cable tower 20 may support a plurality of vertically-oriented antenna reflectors 30. Each reflector 30 functions to support and electrically cooperate with the radiators 28 of the telecommunications antenna. More specifically, each reflector 30 includes a reflecting metal ground plate 30a on one side of the reflector 30 and a printed circuit board (PCB) 30b on the other side of the reflector 30. The PCB is attached to the metal ground plate 30a and includes conductive traces electrically connecting to at least one of the plurality of radiators 28. Accordingly, in the context used herein "the reflector" means the electrical and mechanical structure employed to connect the PCB and its associated radiators 28 to the tower 20. In the described embodiment, four (4) radiators 28 are attached to the PCB 30b including: (i) a low-band radiator having an operating frequency between 698 and 960 MHz, (ii) a high band radiator having an operating frequency between 1.695 and 2.700 GHz, (iii) a CBRS radiator having an operating frequency between 3.400 and 4.200 GHz and (vi) an LAA radiator operating between 5.150 and 5.925 GHz.

In the described embodiment, three (3) ground plane reflectors 30 are depicted circumscribing the central cable tower 20 and are one-hundred and twenty degrees (120°) apart. One of the reflectors 30 is illustrated in an exploded view to reveal underlying cable guide plates 40, discussed in greater detail hereinafter. While three reflectors 30 are depicted, it will be appreciated that the telecommunications antenna 10 may comprise as few as one reflector or as many as eight (8) reflectors equiangularly disposed about an axis 10A of the centrally located cable tower 20.

Figure 6:
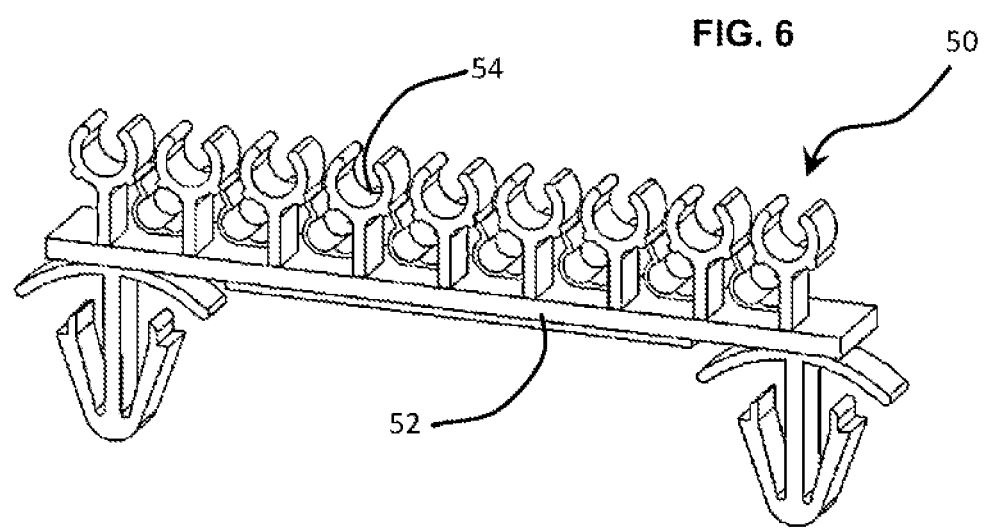
FIG. 6 is an isolated perspective view of a linear multiple C-clip retainer for wrapping a coaxial cable around the cable tower of the telecommunications antenna.
Figure 7:
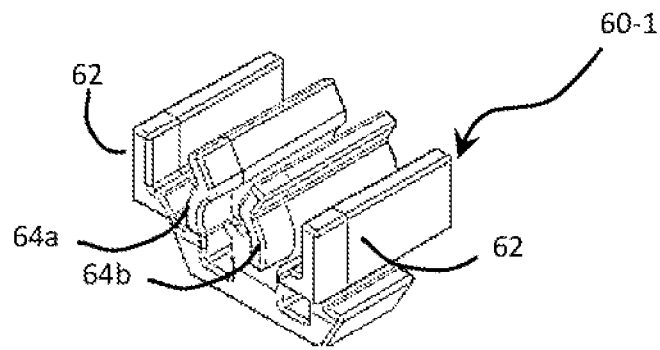
FIG. 7 is an isolated perspective view of a strain relief clip accommodating a single coaxial cable.
Figure 8:
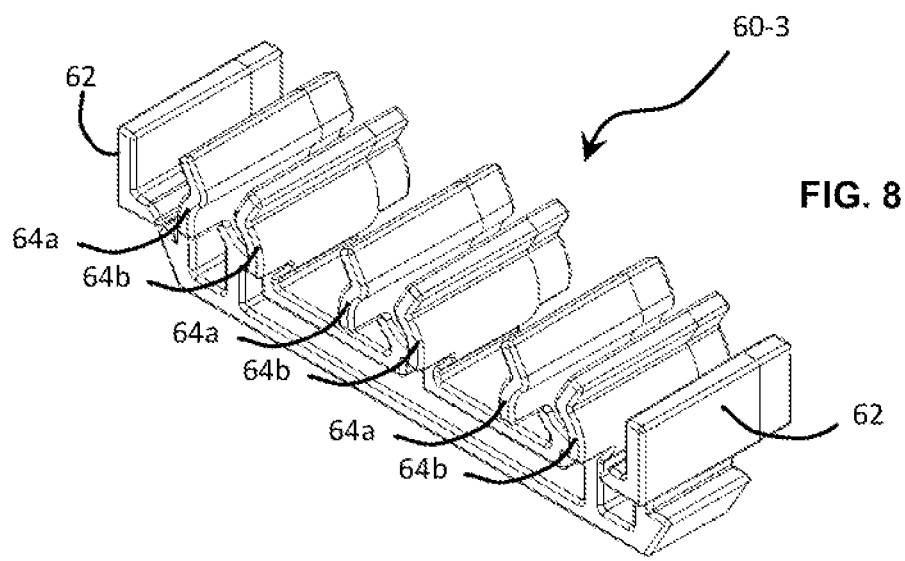
FIG. 8 is an isolated perspective view of a strain relief clip accommodating multiple coaxial cables.
Figure 9:
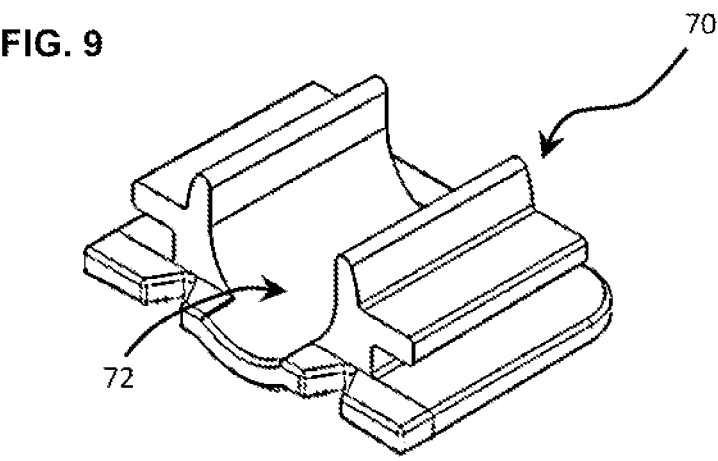
FIG. 9 is an isolated perspective view of a conductive cradle which is soldered to, and disposed over, a conductive trace on one of the PCBs.

In the described embodiment, the axis 10A of the cable tower 20 is normal to, or at a right angle relative to the circular support base plate 12, however, the axis 10A may produce a small angle, e.g., +/−five (5°) degrees (between eighty-five degrees (85°) to ninety-five (95°) degrees) relative to the base plate 12. Furthermore, the centrally located cable tower 20 is aligned with the geometric center 10A of the base plate 12. Structurally, the cable tower 20 is segmented into an equal number of sections or sectors depending upon the number of reflectors 30. Furthermore, in FIGS. 1-5, the cable tower 20 includes a plurality of radially projecting tabs 22, a plurality of radially projecting stanchions or arms 24, and a plurality of linearly-aligned apertures 26 disposed along the length of the cable tower 20. With respect to the latter, and referring to FIG. 6, the linearly aligned apertures 26 receive one or more multiple C-clip retainers 50 each having a linear base 52 and a plurality of C-clips 54 projecting outwardly from the linear base 52. The multiple C-clip retainers 50 will be discussed in greater detail hereinafter when discussing the method of fabricating the telecommunications antenna 10.

Figure 2:
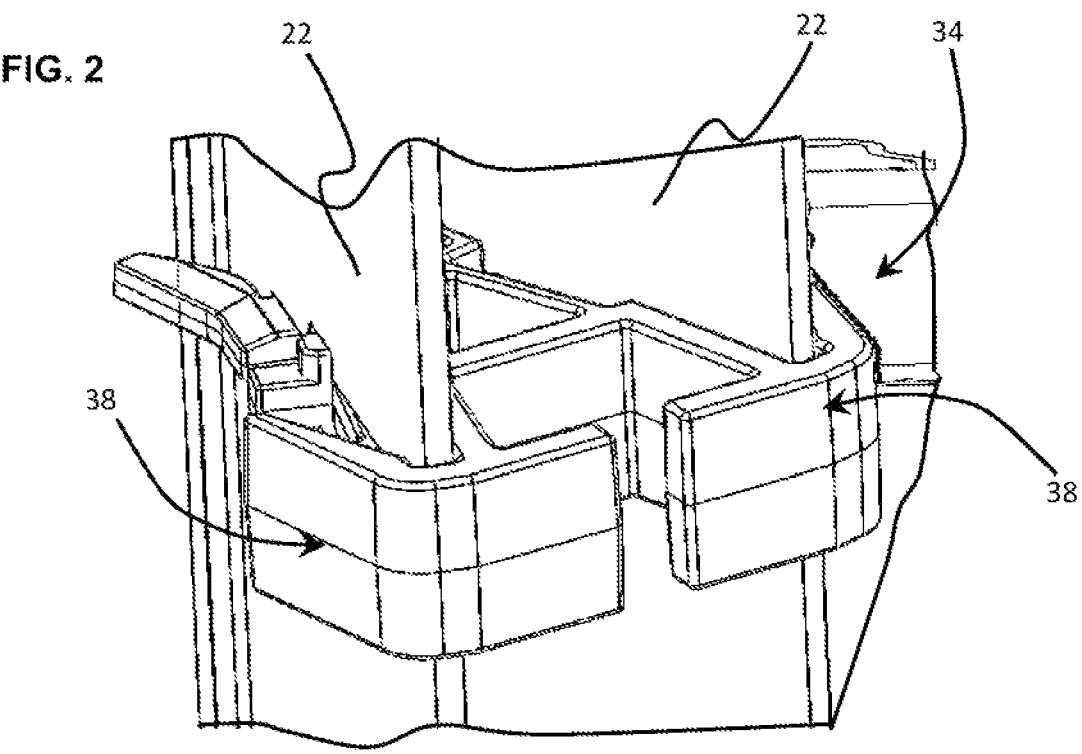
FIG. 2 is a broken-away, perspective view of the isolating clip for structurally connecting the edges of each of the reflectors while electrically isolating one reflector from another.
Figure 3:
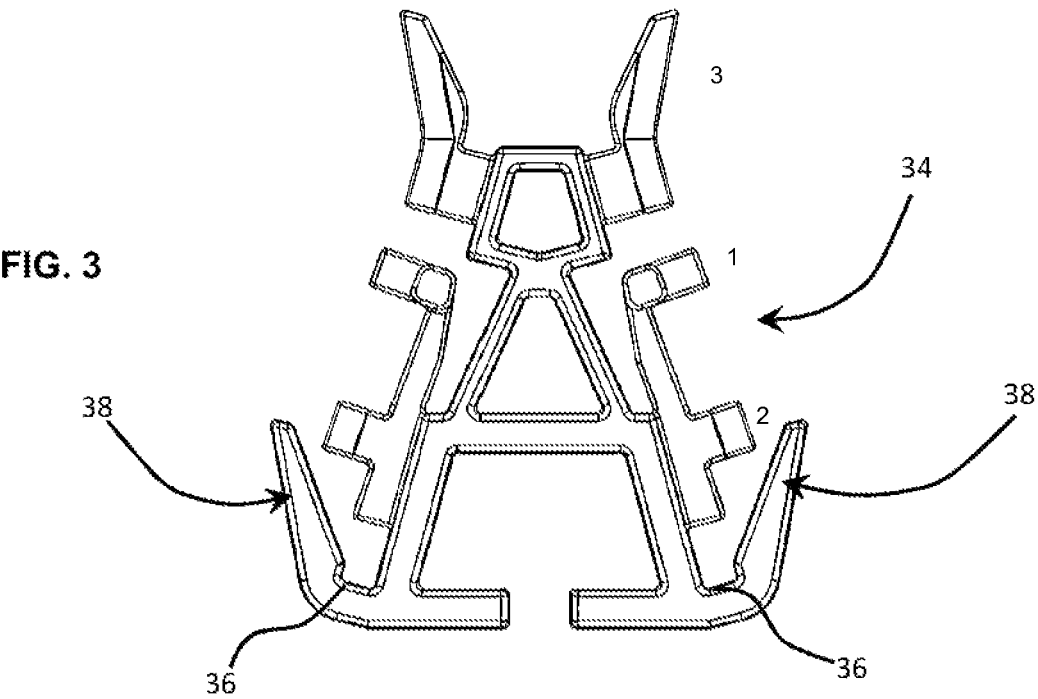
FIG. 3 is an isolated top view of a isolating clip operative to structurally interconnect segments of the antenna, i.e., segments of the central cable tower, without effecting an electrical connection across the reflectors.

The outwardly projecting tabs 22 are connected by an isolating clip 34 depicted in FIGS. 2 and 3. A U-shaped channel 36 of the isolating clip 34 is configured to engage an outboard edge of each tab 22 and is spread apart by a pair of inwardly projecting resilient tabs 38, i.e., of the isolating clip 34, such that the outboard edge of each radially projecting tab 22 is received within and engages the U-shaped channel 36. The isolating clip 34 is fabricated from a low dielectric material such as a thermoplastic, thermoset, or urethane material such that electric current may not cross from one segment of the cable tower 20 to another. Functionally, the isolating clips 34 electrically isolate each of the reflectors 30.

Inasmuch as this same criterion applies to the reflectors 30, it should be appreciated that these same isolating clips 36 may be used for the purpose of connecting and stabilizing the reflectors 30. Tabs (not shown) similar to those depicted in connection with each of the cable tower segments 20, may be formed along the edges of each reflector 30. An isolating clip, similar to that shown in FIGS. 2 and 3, may be employed at the apex or junction between the reflectors 30 to secure or stabilize the reflectors 30 around the cable tower 20 while electrically isolating one reflector 30 from another reflector 30.

Figure 4:
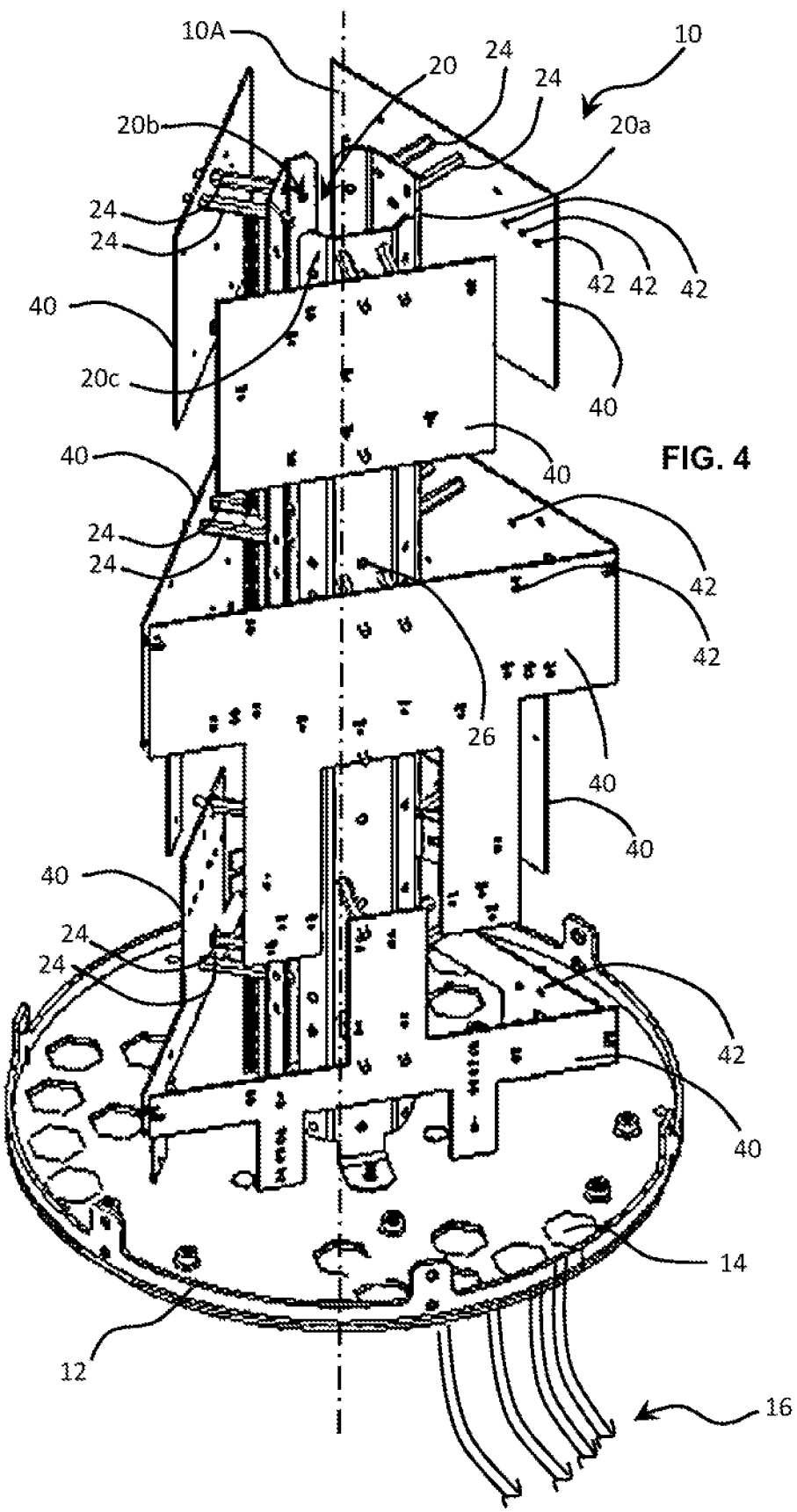
FIG. 4 is an isolated perspective view of the internal structure of the sector antenna including the base plate, vertical cable tower, and the cable guide plates which mount to the central cable tower.
Figure 5:
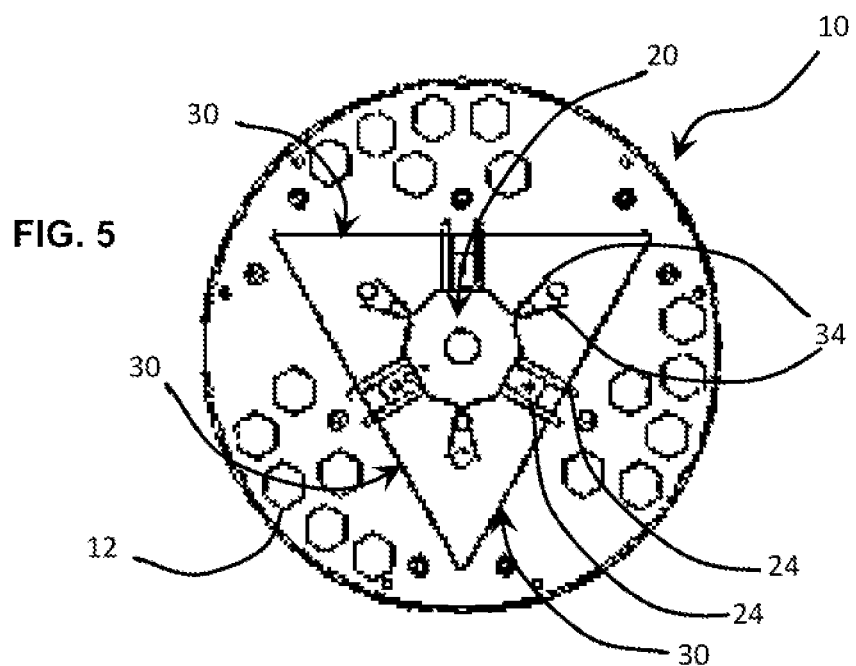
FIG. 5 is a top view of the internal structure of the sector antenna shown in FIG. 4.

In FIGS. 1 and 4, the sector antenna 10 includes a plurality of cable guide plates 40 which are employed as directional tools, but which are incorporated into the final work product. That is, the disclosure includes a plurality of cable guide plates that become part of the product "as sold" and which provides a continued resource throughout the service life of the product.

The cable guide plates 40 are configured to include a plurality of predetermined apertures 42 corresponding to predetermined locations within, along or on, the respective reflector 30. The planform of each cable guide plate 40 may have any of a variety of shapes which may include a rectangle, a trapezoid, a polygon, an I-shape, T-shape, U-shape, F-shape, or E-shape, etc. The shape of the cable guide plate 40 is principally driven by the location of the cable connection, i.e., the aperture 42 for guiding the coaxial cable conductor 46 through the cable guide plate 40, relative to the trace along the PC board of the reflector 30.

While a plurality of separate or independent cable guide plates 40 are employed in the described embodiment, it should be appreciated that a single cable guide plate 40 may serve the needs of a particular application. That is, a single cable guide plate 40 may provide the requisite guidance associated with a particular reflector 30. Hence, at least one cable guide plate 40 is connected to or hung from the stanchions 24 of the central support pole or cable tower 20. In the embodiment of FIG. 4, three (3) cable guide plates 40 are attached to the stanchions 24 of each of the segments 20a, 20b, 20c for a total of nine (9) cable guide plates in all. The coaxial cable 44 may be routed from an aperture 42 at one location, e.g., in one cable guide plate 40, to an aperture 42 at another location, e.g., in the same or different cable guide plate 40 (see FIG. 12). The connecting cables 44 may be routed to the same or different cable guide plate 40 in a predetermined arrangement to minimize overlap such that maintenance and repair to one damaged cable 44 can be made without impacting or affecting another of the internal connecting cables 44. That is, the cables 44 are routed to maintain flexibility and ease of replacement should a cable 44 become damaged or disabled.

The step of routing a coaxial cable 44 from one aperture 42 to another within the same or different cable guide plate 40 may include several sub-steps associated with wrapping the cable 44 around the central cable tower 20. This is done to prevent the cable 44 from finding its own home between the back-side of the antenna reflector 30 and the central support pole or cable tower 20. The first sub-step may include the step of: attaching one or more C-clip retainers 50 to the cable tower 20. Next, the cable 44 may be wrapped around the cable tower 20, in a spiral fashion, along the length of the cable tower 20. This sub-step may include a similar or different spacing with each revolution as the cable 44 is wrapped around the central cable tower 20. The sub-steps F1, F2 enable the optimal use of the internal space between the central cable tower 20 and the guiding cable guide plates 40.

Strain Relief & Soldered Electrical Connection for a Cable Guide Plate-Guided Telecommunications Antenna Another embodiment of the disclosure comprises a strain relief and soldered electrical connection depicted in FIGS. 7-10. The conductive connection 100 (best shown in FIG. 10) electrically connects each of cables 44 as they enter and pass through the aligned apertures 42, 56 of a cable guide plate 40 and reflector 30, respectively. More specifically, the cable 44 is guided through a cable guide plate aperture 42 which, due to its co-location with the reflector aperture 56, also passes through the corresponding reflector aperture 56. The portion which extends beyond the reflector aperture 56, may be stripped to expose the outer conductor 66 and center conductor 46. Alternatively, the coaxial cable 44 may have been previously prepared so as to expose end portions of the inner and outer conductors of the cable 44. In the configuration illustrated, the inner conductor is soldered to trace 58b on the PCB, and the outer conductor 66 is soldered to conductive cradle 70, which is soldered to a conductive ground plane 58a on the opposite side of the PCB.

The aperture 56 is configured to accept a strain relief clip 60-1 which snap-fits into the opposed edges of the aperture 56. The strain relief clip 60-1 comprises a pair of vertical tabs 62 for squeezing the clip inwardly as the clip 60-1 is pushed downwardly into the aperture 56. The strain relief clip 60-1, shown in FIG. 7, also includes a pair of opposed C-shaped elements 64a, 64b which cooperatively secure the coaxial cable (not shown) when disposed between the elements 64a, 64b, i.e., the clips 64a, 64b are spring-biased inwardly to capture the coaxial cable 44 between the elements 64a, 64b.

As mentioned above, conductive cradle 70 is disposed over and soldered to a conductive ground plane (not shown) disposed on the opposite side of the PCB. The conductive cradle 70 includes a U-shaped portion configured to receive outer conductor 66 of the coaxial cable (illustrated in FIG. 10). In the disclosed embodiment, the U-shaped cradle 70 does not frictionally engage the outer conductor 66 or secure the cable 44 by an interlocking element. Rather, the outer conductor 66 of the coaxial cable 44 is structurally connected/secured to the reflector 30 by the strain relief clip 60-1 and electrically connected by soldering the outer conductor 66 to the conductive cradle 70. It will be appreciated that the electrical connection has not been completed until the center conductor 46 of the coaxial cable 44 is electrically connected to a trace 58b on the PCB.

In the illustrated embodiment, a prepared cable (i.e., one that has been stripped) is bent at a right angle such that the coaxial cable 44 is urged between the elements 64a, 64b, to capture the coaxial cable 44 therebetween. Furthermore, the outer conductor 66 is caused to seat against the U-shaped surface 72 of the conductive cradle 70 while the end 46 of the center conductor extends beyond the cradle 70. Inasmuch as the thickness of the dielectric/insulating core (not shown) of the coaxial cable 44 is relatively small, the center conductor 46 lies reasonably close to the trace 58, however, one may choose to bend the conductor 46 such that it contacts the trace 58. Notwithstanding its proximity, the outer conductor 66 is coupled to the ground plane (not shown) disposed on the opposite side of the PCB, and center conductor 46 soldered to conductive trace 58 on the upper surface of the PCB.

Cable Jacket Flare

Figure 10:
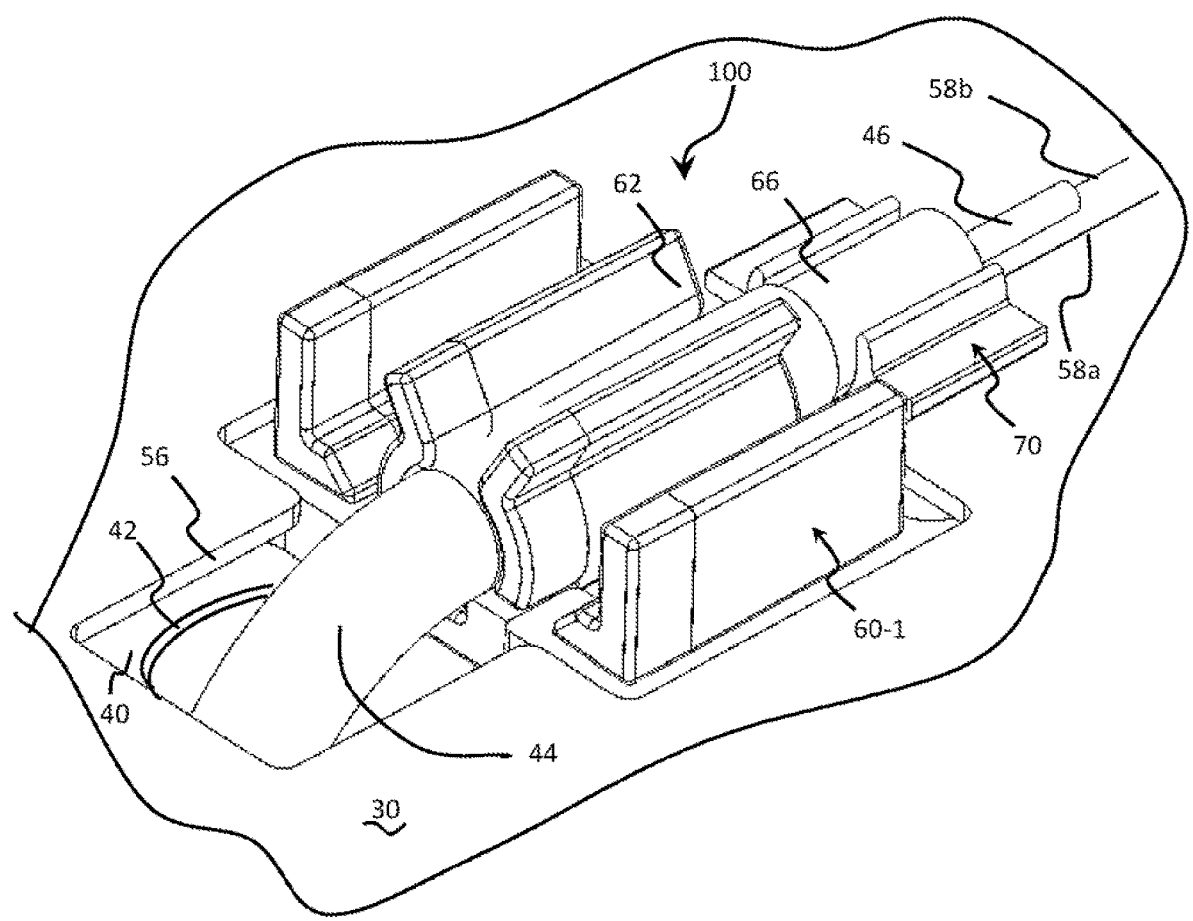
FIG. 10 is an enlarged, broken away, view of a Strain Relief & Soldered Electrical Connection including a strain relief clip disposed in combination with the antenna reflector and a conductive cradle disposed adjacent to the strain relief clip.
Figure 11A:
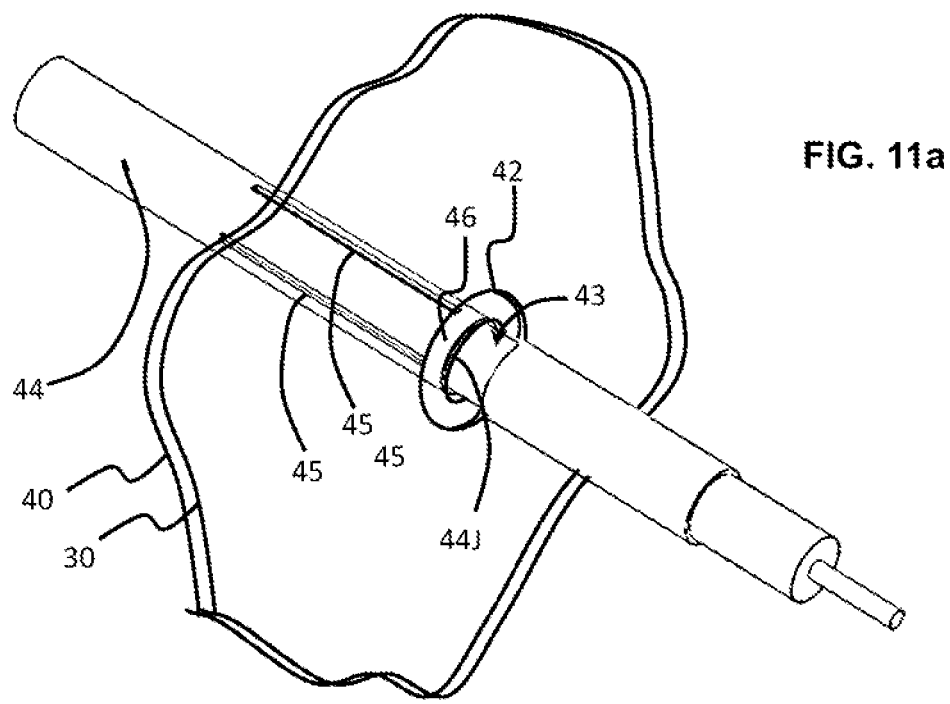
FIG. 11a is an broken-away perspective view of a coaxial cable being prepared for connection to the Strain Relief & Soldered Electrical Connection shown in FIG. 10.
Figure 11B:
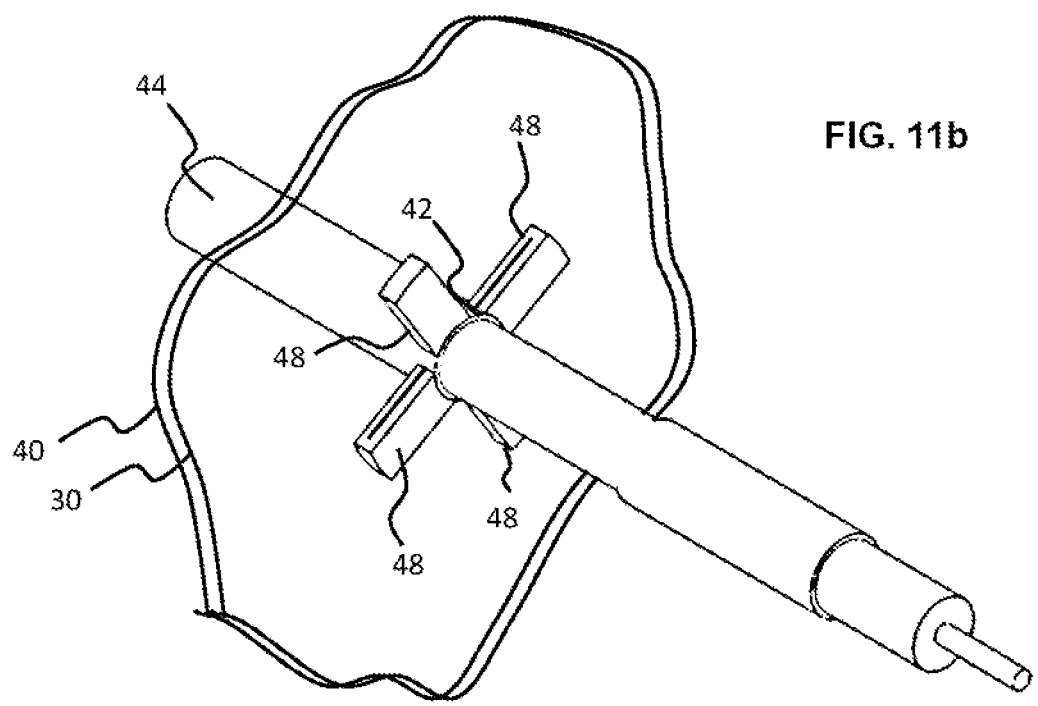
FIG. 11b is an broken-away perspective view of the coaxial cable shown in FIG. 11a wherein the forward portion of the cable jacket is pulled rearwardly to create a plurality of stops.

FIGS. 10, 11a and 11b depict yet another embodiment of the disclosure, relating to the length of the coaxial cable 44 as it passes through each aperture 42 in the cable guide plate 40. It will be appreciated that this length needs to be consistent across all the cables 44 to ensure proper seating of each coaxial cable 44 into the strain relief clip (FIG. 10) as well as the conductive cradle 70 when the cable 44 is bent to snap into the strain relief clip 60-1. To control the length of the cable 44 passing beyond aperture 42, a simple cost effective, the following method steps are employed to prevent the cable 44 from passing beyond a desired length or, to ensure that the cable 44 was sufficiently long to properly form the electrical connection.

The method of this operation includes the following steps. In a first step, the jacket 44J of the cable 44 is cut to expose a small window 43 of conductive braid beneath the jacket 44J. In a subsequent step, four (4) slits 45 are cut along the length of the cable 44 at precise locations such that a forward portion 46 of the jacket 44J, i.e., the position forward of the slits 45, may be displaced rearwardly to cause the jacket 44J to fold radially outwardly. Accordingly, four (4) jacket stops 48 are formed the around the circumference of the the cable 44. The cable stops 48 may be formed by a gripping tool to pull the jacket 46 rearwardly or by the interference of the aperture 42 with the jacket 46, i.e., as the coaxial cable 44 is pulled, or pushed through the aperture 42. As a consequence, when the cable 44 is fed through the aperture 42. The cable is then fed through a gripping tool which grips the jacket and pushes back the jacket to create the flare in the jacket. The cable will now, not be able to completely pass through the aperture 42 in the cable guide plate 40 and the correct length of cable will be protruding from the aperture to ensure that the cable can be correctly seated into the strain relief clip.

Guided Fabrication, Maintenance and/Repair of a Telecommunications Antenna

Figure 12:
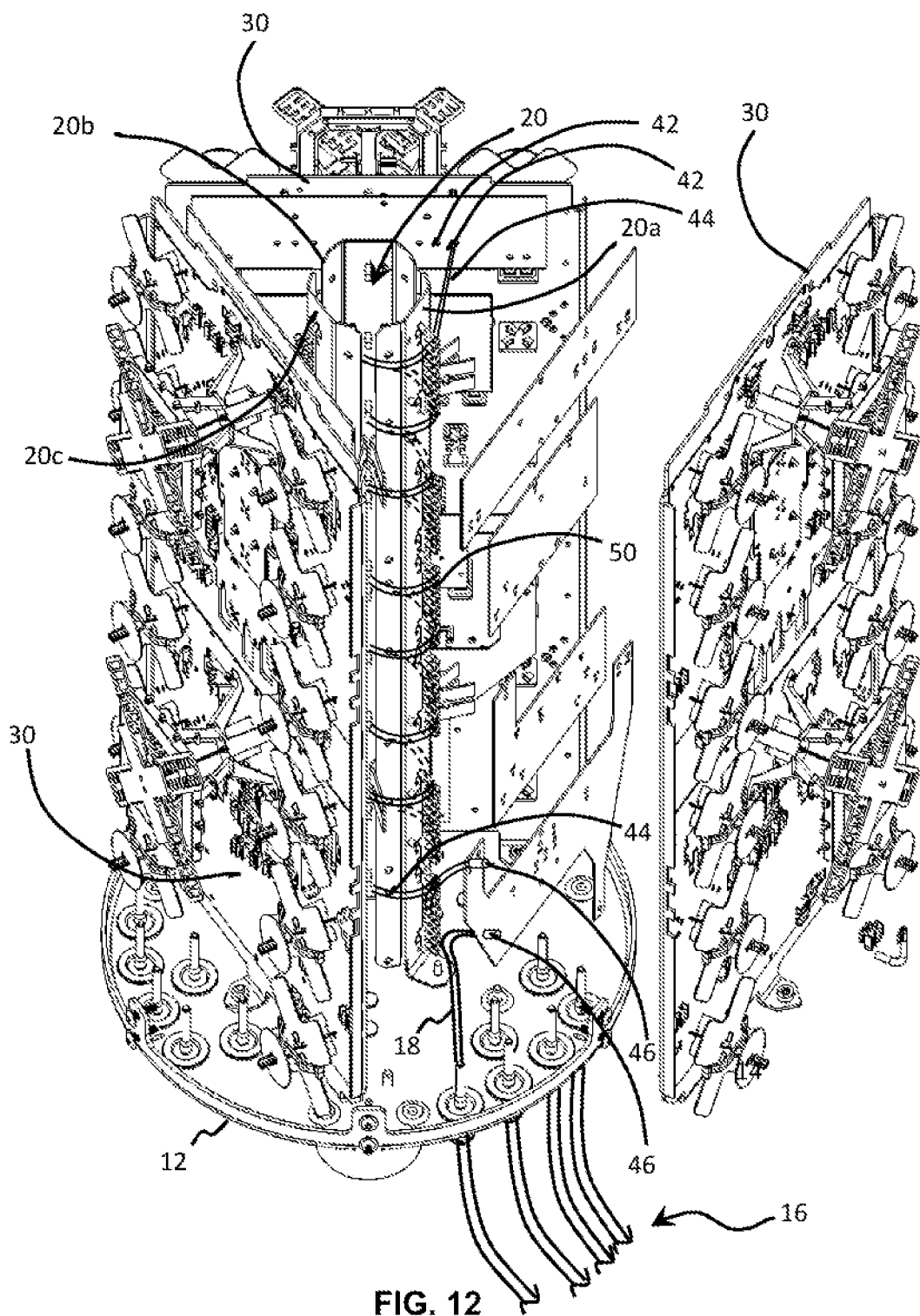
FIG. 12 depicts an exploded, perspective view of the sector antenna including a cable being guided from one reflector to another via intervening guide cable guide plates and C-clip retainers to facilitate a spiral wrap around the central cable tower.

FIGS. 12 and 13, illustrate the principle, i.e., most relevant, method steps for fabricating the sector antenna 10 of the disclosure. It will be appreciated that the method steps described herein need not be performed in any particular sequence or order, however, each of the steps should be practiced in accordance with the teachings to obviate difficulties which have been learned and can now be avoided by following the outlined steps.

A first step A in the method includes fabricating a substantially flat or horizontal disc or base plate 12 including a plurality of apertures for receiving a plurality of input cables 16 through the thickness of the plate 12. The base plate 12 may include cable connectors on each side for attaching the input cable 16 below and an internal transmitting cable 18 within (or above). The transmitting cable is also in communication with the input cable below. In a subsequent step B, the segmented central cable tower 20 are configured to include a plurality of radially projecting stanchions or arms 24 and radially projecting tabs 34. In a step C, the segmented central cable tower is assembled in combination with the base plate 12 such that the virtual center of the assembled cable tower 20 is aligned with the geometric center of the base plate 12. Assembly of the cable tower 20 may include the use of the isolating clips 36 which connect to the outwardly projecting tabs 34 (see FIGS. 2 and 3)

In a next step D, cable guide plates 40 are configured with a plurality of predetermined apertures 42 which correspond to predetermined locations along the back-side of the respective reflector 30, i.e., the side facing the cable tower 20. In this step, the guide plates 40 are arranged in a stratified manner from bottom to top. That is, the guide plates 40 may be added in a tiered fashion as the cables 44 are guided into the back side of the reflector 30 and electrically connected to the antenna components, i.e., radiators 28. Initially the coaxial cables 44 are spirally secured to the central tower 20 such that the cables 44 are neatly and tightly packaged against the tower 20. Next, the first of the lower cable guides 40 are used to position and prepare the cables 44 for making the necessary electrical connections i.e., the soldering operations. Next, the mid-level or mid-tier guide plates 40 are assembled to position and prepare the cables 44 for the next electrical connections and, finally, the upper-level or upper-tier guide plates 40 are assembled for preparing the final electrical connections. In this way, the guide plates 40 are used in the initial assembly of the telecommunications antenna 10, but also remain within the assembled product to provide guidance when performing maintenance and repair on the telecommunications antenna 10.

In a step E, at least one cable guide plate 40 is connected to or hung from the stanchions 24 of the cable tower 20. In the embodiment of FIG. 4, three (3) cable guide plates 40 are attached to the stanchions 24 of each of the segments 20a, 20b, 20c for a total of nine (9) cable guide plates in all. Any number of cable guide plates 40 may be employed provided that at least one cable guide plate 40 is hung from at least one of segments 20a, 20b, 20c of the cable tower 20.

In a step F, the connecting cables 44 are routed from an aperture 42 at one location, e.g., in one cable guide plate 40, to an aperture 42 at another location, e.g., in the same or different cable guide plate 40. The connecting cables are routed to the same or different cable guide plate 40 in a predetermined arrangement to minimize overlap. This is necessary to ensure that maintenance and repair to one damaged cable 44 can be made without impacting or affecting another of the internal connecting cables 44. That is, the cables 44 are routed to maintain flexibility and ease of replacement, should a cable 44 become damaged so as to adversely impact the transmitted signal. This step F may further include first and second sub-steps F1, F2. The first sub-step includes attaching one or more C-clips 50 to the cable tower 20 linearly along its length. The second sub-step includes wrapping the connecting cable 50 around the central cable tower 20 in a spiral pattern while securing the connecting cable 50 through the individual clips 52 of each linear C-clip 50. Steps F1 and F2 enable optimal use of the internal space available between the central cable tower 20 and the guiding cable guide plates 40. Additionally, Step F may include third and fourth sub-steps F3 and F4 wherein, as previously discussed, the cable jacket 44J may be cut to provide a window 43 (Step F3) and elongate slits 45 along the axis of the coaxial cable 44 (Step F4) to provide stops 48 along the cable jacket 44J. Sub-steps F3, F4 ensure that a precise length of cable 44 is passed through the aperture 42 in the cable guide 40 to facilitate the assembly of the electrical connection on the opposite side of the PCB ground.

In a next step G, each of the reflectors 30 may be connected to either the base plate 12, the cable guide plates 40, or both. Notwithstanding the method of attachment, the cable guide plate 40 and reflector apertures 42, 56 are aligned such that the coaxial cables 44 and the conductor ends 46 project through the aligned apertures 42, 56. It should also be appreciated that each of the reflector apertures 56 lie adjacent conductive traces 58 for transmitting and receiving signals from one of the radiators. Furthermore, it should be mentioned that all or most of the radiating elements, e.g., high and low band radiators, are preassembled onto the reflector 30 prior to assembly with the base plate 12 and/or with the cable guide plates 40. More specifically, the apertures 56 are machined, conductive traces 58 are formed, and the U-shaped conductive cradle 70 is pre-soldered to the conductive ground plane disposed on the opposite side of the PCB.

It will be appreciated that the order of steps E, F and G may be varied, e.g., the cable guide plates 40 and reflectors 30 may be assembled (steps E and G) before routing the connecting coaxial cables 50 (Step F). Alternatively, the reflectors 30 may be assembled (Step G) before introducing the cable guide plates 40 (Step E.)

In a subsequent step H, a strain relief clip 60 is snap-fit into engagement with each of the apertures 56 through which each connecting cable 44 passes. It will be appreciated that certain steps may be performed at times when it is more convenient to perform. For example, step H may be performed before step G since it may be more convenient for the strain relief clip 60 to be attached before the metal reflectors are assembled with the is convenience In a next step I, each of the connecting cables 44 is bent at a right angle to pass through an upper C-shaped portion 62 of the strain relief clip 60. This step allows the outer conductor 66 of the connecting cable 44 to seat within the U-shaped conductive cradle 70 while the inner conductor 46 of the cable 44 extends beyond the cradle 70 and adjacent to trace 58. With the outer conductor 66 in place, the final steps J and K include soldering the outer conductor 66 to the conductive cradle 70 (step J) and soldering the end of inner conductor 46 of the cable 44 to the trace 58 (step K.)

As mentioned in the preceding paragraphs, the strain relief clip 60 may include multiple C-clips for securing multiple cables. For example, the aligned apertures 42, 56 (seen in FIG. 9) may be larger in diameter and/or width such that several coaxial cables may pass through the apertures 42, 56. In such instances, a strain relief clip 60-3 may be configured to secure several, e.g., three (3), cables. In this instance, a conductive cradle having three U-shaped surfaces may be employed to receive the outer conductor of each cable. As such, the three cables are urged into engagement with the clips 64a, 64b (see FIG. 8) of the strain relief clip 60-3. Similar to the strain relief and soldered electrical connection associated with a single cable, the multi-cable embodiment may include a multiple U-shaped surface of a conductive cradle (not shown) for soldering the outer conductor of each cable may be electrically coupled to the conductive ground plane disposed on the opposite side of the PCB, and three center conductors may be soldered to respective traces on the PCB.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The invention claimed is:

1. A sector antenna comprising:
    a base plate;
    a cable tower mounting to the base plate and having an axis projecting normal to the base plate;
    at least one antenna reflector mounting to the base plate and substantially parallel to the axis of the cable tower, the reflector including a plurality of electrical components operative to transmit and receive telecommunications signals in an arcuate sector of the antenna, the reflector having an inwardly facing surface opposing the cable tower and an outwardly facing surface disposed away from the cable tower; and
    a cable guide plate interposing the cable tower and the reflector, the cable guide plate having apertures each providing a guide through which a conductor may pass for making an electrical connection to one of the electrical components along the outwardly-facing surface of the reflector.

2. The sector antenna of claim 1, further comprising first and second reflectors, first and second cable guide plates interposing the first and second reflectors, respectively, and wherein first and second conductor ends of a coaxial cable pass through apertures in each of the first and second reflectors such that an electrical connection is made between electrical components of the first and second reflectors.

3. The sector antenna of claim 2, further comprising:
    a multiple C-clip retainer having a plurality of linearly aligned C-clips, the multiple C-clip retainer connecting to and aligned with the axis of the cable tower, and
    wherein the coaxial cable is wrapped around the cable tower in a spiral pattern such that the coaxial cable is captured in at least one of the C-clips of the multiple C-clip retainer.

4. The sector antenna of claim 2, wherein the first and second reflectors include reflector apertures corresponding to the guide apertures of the respective first and second cable guide plates, wherein the first and second reflectors each include strain relief electrical connections comprising a strain relief clip having C-shaped channels aligned with U-shaped surfaces of a conductive cradle.

5. A method for fabricating a sector antenna comprising the steps of :
    producing a base plate;
    configuring a cable tower for mounting to the base plate and having an axis projecting normal to a plane of a base;
    attaching a reflector to the base plate such that it is substantially parallel to the axis of the cable tower, the reflector including a plurality of electrical components operative to transmit and receive telecommunications signals in an arcuate sector of the antenna; and
    interposing a cable guide plate between the cable tower and the reflector such that a plurality of guiding apertures are aligned with, and correspond to, an electrical trace associated with at least one of the electrical components connected to the outwardly facing surface of the reflector.

6. The method for fabricating a sector antenna of claim 5, wherein the step of interposing the cable guide plate between the cable tower and the reflector includes the step of securing the cable guide plate to a radially projecting arm formed in combination with the cable tower.

7. The method for fabricating a sector antenna of claim 5, wherein the step of configuring a cable tower for mounting to the base plate includes the steps of:
    segmenting the cable tower into a plurality of elongate sections corresponding to a number of reflectors of the sector antenna and
    configuring the cable tower to include a plurality of radially projecting arms, and wherein the step of interposing the cable guide plate between the cable tower and the reflector includes the step of:
attaching the cable guide plate to the radially projecting arms of the elongate section.

8. The method for fabricating a sector antenna of claim 5 further comprising the step of:
attaching a multi-clip retainer such that the clips are linearly aligned with the axis of the cable tower, and
wrapping the cable around the axis of the cable tower while urging a coaxial cable into at least one clip of the multi-clip retainer.

* * * * *